Nov. 27, 1951   D. H. LUKENS   2,576,467
WICKET DRIVING VEHICLE
Filed March 3, 1950
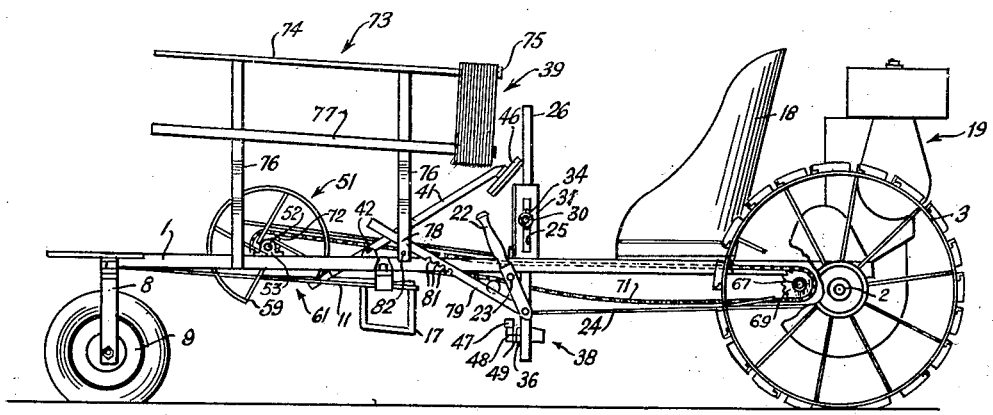
Inventor
DUANE H. LUKENS
Ely & Frye
Attorneys Patented Nov. 27, 1951

2,576,467

UNITED STATES PATENT OFFICE 2,576,467

WICKET DRIVING VEHICLE

Duane H. Lukens, Kent, Ohio

Application March 3, 1950, Serial No. 147,429

20 Claims. (Cl. 61—75)

1

This invention relates to an implement for inserting articles into the ground and, in particular, relates to a vehicle adapted to drive into the ground, in spaced relation, wickets which are employed as a support for a protective covering laid over a row of plants.

In the business of truck farming, it is desirable that certain plants be set out early in the season. In order to avoid destruction of the plants by frost, a protective covering is placed over them. This is conveniently accomplished by inserting U-shaped wickets into the ground, at spaced intervals along each row of plants, placing a continuous strip of waxed paper or the like over the wickets in each row, to cover the plants, and then placing soil along the marginal edges of the paper to hold it anchored in place.

Up to the present time, the step of placing the wickets has involved inserting them individually, by hand, although this is tedious, laborious, and time-consuming. Also, it is necessary that the height of the wickets above ground be uniform, in order to avoid wrinkling and tearing of the covering paper, but such uniform placing of the wickets is difficult, if not impossible, by the hand method.

In the present invention, I have overcome the above-enumerated difficulties by providing a mobile implement having elements adapted to drive the wickets into the ground, at a uniform height thereabove and in uniformly spaced relation in response to forward progress of the said mobile implement. In particular, this is accomplished by a hammer actuated by a cam which is geared so as to move cyclically in a definite ratio to the progress of a vehicle on which the cam and hammer are mounted.

It is, therefore, an object of the invention to lessen the labor and time involved in the placing of supports for plant-protecting blankets. Another object is to render more uniform the spacing of such supports and the height thereof above ground. More particularly, it is an object to provide a wicket driving device, operating automatically, in timed relation to progress of a vehicle on which it is mounted to place wickets at uniformly spaced intervals and at uniform height above ground.

These and other objects will be apparent to those skilled in the art from the detailed description set forth in the following specification, as illustrated in the drawings, in which:

Fig. 1 is a side elevation of a tractor vehicle embodying the invention,

Fig. 2 is a top plan view of Fig. 1, with one rear wheel removed,

2

Fig. 3 is a sectional view taken on the line 3—3 of Fig. 2, showing the hammer in dropped position, and Fig. 4 is an enlarged view taken on the line 4—4 of Fig. 2 showing a wicket as inserted in the ground.

Referring to the drawings by characters of reference, there is shown a tractor vehicle comprising a rectangular chassis framework 1 of angle iron mounted on the shaft 2 of rear traction wheels 3, and on a cross bar 4, which is pivoted on a pintle 6 carried by a transverse bar 7 of the chassis and has depending forks 8 in which front wheels 9 are journaled. Steering is accomplished by a pair of links 11, pivoted on the cross bar 4. Each link 11 is pivoted by a pin 12 to an arm 13, which in turn is pivoted on a pin 14 carried in a bracket 16 on the frame 1. The linkage is actuable by the feet of the occupant of the vehicle engaging in stirrups 17, which are also pivoted on pin 12.

A rod 15, with bent ends 20 welded to the frame, serves as a handle by which the front end of the vehicle may be lifted, and the vehicle turned about. This is a convenience where a long turning radius is undesirable, impractical, or impossible. To facilitate such quick turning, the drive wheels will preferably be equipped with a conventional ratchet arrangement or other equivalent over-running feature.

A seat 18 is secured to frame 1 and an engine, indicated generally by the numeral 19, is secured to the frame by bolts 21. A lever 22, pivoted at 23, on the frame, carries a pull rod 24 leading to the clutch mechanism of the engine.

All of the foregoing described parts are conventional and form no part of the novel features of the invention.

A pair of vertically arranged channel members 26, 27 provide guides in which the wickets slide as they are driven downward. The channels are arranged with their open sides facing one another and are supported by means of horizontal rods 28, 29, welded to their outer sides and secured to upright angle bars 31, 32 which are welded to the frame 1. Rods 28, 29 have reduced, threaded ends passing through slots 25 in the angle bars and are secured, in the desired vertical position, in the slots by means of outer nuts 30 and inner nuts 33, having suitable washers 34.

A cross plate 36, secured by bolts 37 to channels 26, 27 near the lower ends thereof, carries a stop member 38 which serves to limit the downward travel of a driven wicket. Plate 36 is provided with slots 35 through which the bolts 37 pass, the bolts being movable along the slots so that the distance between channels 26, 27 may be adjusted to accommodate the particular width of wickets employed, such adjustment being effected by manipulating nuts 30 and 33. A typical wicket 39 is shown in Fig. 4 driven into the ground. It will be seen that the upper surface of stop member 38 is arcuate in a direction crosswise of the vehicle to conform to the arched form of the top of the wicket, and also that the upper surface of member 38 is slanted in a direction lengthwise of the vehicle so that it will move away from a driven wicket without frictional binding therewith.

The hammer for driving the wickets has an arm 41 secured, as by welding, to a shaft 42 arranged crosswise of the vehicle and journaled in blocks 43, 44 secured to the frame. The hammer has a head 46 in the form of a segment of a cylinder, which head, in the lowered position of the hammer, overlies the arcuate stop member 38 in mating relation therewith, as shown in Fig. 3. In order to avoid excessive shock between the hammer head and the stop member, a rubber bumper 47 is provided. Preferably, bumper 47 is so arranged that the hammer head approaches very near to stop 38 in its fall, but does not actually contact the stop. In order to position the bumper properly, and also to provide for wear in the bumper, it is adjustably mounted. Thus, the rubber head 47 is mounted on a bolt 48 threaded in a nut 49, welded to cross-piece 36. A lock nut may also be provided, if necessary or desirable.

The hammer is actuated by a cam wheel 51, fixed to a shaft 52 arranged crosswise of the vehicle and journaled in bearing blocks 53, 54 attached to the frame. The cam wheel comprises a hub 56, spokes 57, and an arcuate, broad rim 58, the latter being about 270° of arc in extent, with its terminal ends on an adjacent pair of spokes.

As shown in Fig. 1, the hammer head 46 is in raised position when the opposite end of its arm 41, beyond shaft 42, is in tangential contact with rim 58 of the cam wheel and the head remains in raised position during clockwise turning of the cam wheel until the terminal edge 59 of the rim passes the end of the hammer arm. The hammer head is then free to fall and the end of the hammer arm moves upwardly into the open sector 61 of the cam wheel. Continued rotation of the cam wheel brings terminal edge 62 of the cam wheel into contact with the end of the hammer arm and the hammer head is again raised to its upper position. Preferably, the cam follower end of the hammer arm has a flat, beveled area, as at 63, to afford a more gradual pick-up by the cam and to reduce stresses and minimize wear.

The cam is powered from the vehicle drive and, therefore, the action of the hammer is synchronized with the progress of the vehicle, thus evenly spacing the driven wickets. The drive system for the cam originates at a spur gear 64, carried on the driven axle 2 of the vehicle. Gear 64 drives a pinion 66 carried on a stub shaft 67, arranged transversely of the vehicle frame and journaled in a bearing block 68 secured to the frame and depending from the underside thereof. A sprocket 69, attached to shaft 67 on the inner side of the frame, is engaged by a sprocket chain 71, which extends lengthwise of the vehicle and engages a sprocket 72 fixed to shaft 52 of the cam. In the preferred embodiment, the gears have a two-to-one ratio and the sprockets, likewise, have a two-to-one ratio, so that the cam wheel rotates four times while the traction wheels 3 rotate once. In other words, the hammer is dropped four times in a distance equal to the peripheral length of wheels 3 of the vehicle. Either the traction wheels or the gearing, or both, may be varied to provide any desired spacing of the wickets.

In the embodiment of the invention shown, the wickets are hand fed into the guide channels 26, 27 by the driver of the vehicle. In order to have a proper supply of wickets ready to hand, a rack, shown generally at 73, is provided. This rack comprises an upper plate 74 supported on two pairs of upright straps 76 secured to the vehicle frame and bent inwardly in their medial portions so as to be spaced apart in their upper portions a distance approximately equal to the width of the plate 74. A pair of straps 77, secured to straps 76, give rigidity to the rack as a whole and also serve to restrain the free ends of the wickets from swinging. The upper plate 74 serves to receive a quantity of wickets 39 and is preferably tilted downwardly in a direction toward the driver's seat so that the bank of wickets will have a tendency to move toward the rear of the rack as successive wickets are removed. This movement will be assisted by vibrations in the vehicle. An upturned lug 75 on the rear end of plate 74 retains the wickets on the rack.

One of the supported straps has secured at its lower end, and spaced therefrom, an upturned lug 78, behind which is received, in sliding relation, an arm 79 pivoted at its other end to the bottom of hand lever 22 of the clutch control. Arm 79 has teeth 81 engageable with a pin 82 on lug 78 to hold lever 22 in the position wherein the clutch is disengaged.

To operate the device, a suitable supply of wickets is placed on rack 73 and the vehicle is located with its wheels astride the row that is to receive the wickets. As the vehicle moves along the row, the operator removes the end wicket from the rack 73 and places it with tines downward between the channels 26 and 27, moving it to the proper vertical position to receive the hammer head on the top of the arch of the wicket. It will be understood that the tines of the wicket are sufficiently spread that the wicket will be retained in the position in which it is placed in the channels by the spring in the wicket.

As the vehicle progresses, the hammer is released and drives the wicket into the ground with the respective tines on opposite sides of the row of plants. It will be understood that the fall of the hammer is sufficiently rapid that the driving action is almost instantaneous and the insertion of the wicket is not affected by the relatively slow progress of the vehicle.

Immediately after placing a wicket in the channel guides, the operator secures the next wicket from the rack so that it may be placed in the guides as soon as the hammer is returned to raised position.

While a certain preferred embodiment of the invention has been shown, the invention is not limited thereby, since changes in the size, shape, and arrangement, for instance, of the various parts may be resorted to without departing from the spirit or scope of the appended claims.

What is claimed is:

1. An implement for driving articles into the ground at evenly spaced intervals, comprising a vehicle, a hammer pivoted on the vehicle for swinging in a generally vertical path, means to lift the hammer and hold it raised during a predetermined extent of linear progress of the said vehicle and to drop the said hammer cyclically in response to progress of said vehicle, and stop means on said vehicle located in the path of fall of said hammer, and arranged to interrupt fall of said hammer short of contact of said hammer with the ground.

2. An implement for driving articles into the ground at evenly spaced intervals, comprising a vehicle, a hammer pivoted on the vehicle for swinging in a generally vertical path, means to lift the hammer and hold it raised during a predetermined extent of progress of said vehicle, and to drop said hammer cyclically in response to progress of said vehicle, means on the vehicle to temporarily hold an article to be driven, in the path of swing of said hammer, and stop means on said vehicle located in the path of fall of said hammer, and arranged to interrupt fall of said hammer short of contact of said hammer with the ground.

3. An implement for driving articles into the ground at evenly spaced intervals, comprising a vehicle, a hammer pivoted on the vehicle for swinging motion in a generally vertical path, means on the vehicle, actuable in response to linear progress thereof, to lift said hammer and retain it in raised position, said means arranged to release the hammer cyclically in response to said progress of said vehicle, and stop means on said vehicle located in the path of fall of said hammer, and arranged to interrupt fall of said hammer short of contact of said hammer with the ground.

4. An implement for driving articles into the ground at evenly spaced intervals, comprising a vehicle, a hammer pivoted on the vehicle for swinging motion in a generally vertical path, and cam means on the vehicle operable cyclically in timed relation with the progress thereof, said cam means having a portion engageable with the hammer to lift the hammer and hold it raised during a predetermined extent of progress of the vehicle, and said cam means having a portion clearing the hammer whereby the hammer is intermittently free to drop.

5. An implement for driving articles into the ground at evenly spaced intervals, comprising a vehicle, a hammer pivoted on the vehicle for swinging motion in a generally vertical path, cam means on the vehicle, operable cyclically in timed relation with the progress thereof, said cam means having a portion engageable with the hammer to lift the hammer and hold it raised during a predetermined interval of progress of the vehicle, and having a portion clearing the hammer whereby the hammer is intermittently free to drop, and means on the vehicle to temporarily hold an article to be driven, in the path of swing of said hammer.

6. An implement for driving articles into the ground at evenly spaced intervals, comprising a wheeled vehicle, a hammer pivoted on the vehicle for swinging motion in a generally vertical path, a cam rotatably mounted on the vehicle and having a portion located to contact the hammer, and having a portion adapted to clear the hammer, whereby the hammer is intermittently dropped, and a connection between a wheel of the vehicle and the cam, whereby the cam is actuated in synchronized relation with ground progress of the vehicle.

7. An implement for driving articles into the ground at evenly spaced intervals, comprising a wheeled vehicle, a hammer pivoted on the vehicle for swinging motion in a generally vertical path, a cam rotatably mounted on the vehicle and having a portion located to contact the hammer and a portion adapted to clear the hammer, whereby the hammer is intermittently dropped, a connection between a wheel of the vehicle and the cam whereby the cam is actuated in synchronized relation with ground progress of the vehicle, and means on the vehicle for temporarily holding articles to be driven, in the path of swing of said hammer.

8. An implement for driving multi-pronged articles into the ground at evenly spaced intervals, comprising a vehicle, a hammer pivoted on the vehicle for swinging motion in a generally vertical path, means to lift the hammer and hold it raised during a predetermined extent of linear progress of said vehicle, and to drop said hammer cyclically in response to progress of said vehicle, and holding means on the vehicle for articles to be driven comprising elements with vertically arranged grooves, adapted to receive the prongs of said articles in sliding relation, and located in the path of swing of said hammer.

9. An implement for driving multi-pronged articles into the ground at evenly spaced intervals, comprising a wheeled vehicle, a hammer pivoted on the vehicle for swinging motion in a generally vertical path, a cam rotatably mounted on the vehicle and having a portion located to contact the hammer and a portion adapted to clear the hammer, whereby the hammer is intermittently free to drop, a connection between a wheel of the vehicle and the cam whereby the cam is actuated in synchronized relation with ground progress of the vehicle, and holding means on the vehicle for articles to be driven, comprising elements with facing, vertically arranged grooves adapted to receive the prongs of said articles in sliding relation and located in the path of swing of said hammer.

10. An implement for driving articles into the ground at evenly spaced intervals, comprising a vehicle, a hammer pivoted on the vehicle for swinging in a generally vertical path, means to lift the hammer and hold it raised during a predetermined extent of progress of said vehicle, and to drop said hammer cyclically in response to progress of said vehicle, means on the vehicle to hold an article to be driven, and stop means on the vehicle to limit downward motion of the articles when driven.

11. An implement for driving articles into the ground at evenly spaced intervals, comprising a vehicle, a hammer pivoted on the vehicle for swinging in a generally vertical path, means to lift the hammer and hold it raised during a predetermined extent of progress of said vehicle, and to drop said hammer cyclically in response to progress of said vehicle, means on the vehicle to hold an article to be driven, stop means on the vehicle to limit downward motion of the articles when driven, and resilient means on the vehicle to arrest fall of the hammer short of contact thereof with said stop means.

12. An implement for driving multipronged articles into the ground at evenly spaced intervals, comprising a wheeled vehicle, a hammer pivoted on the vehicle for swinging motion in a generally vertical path, a cam rotatably mounted on the vehicle and having a portion located to contact the hammer and a portion adapted to clear the hammer, whereby the hammer is intermittently free to drop, a connection between a wheel of the vehicle and the cam whereby the cam is actuated in synchronized relation with ground progress of the vehicle, holding means on the vehicle for articles to be driven, comprising elements with facing, vertically arranged grooves, adapted to receive the prongs of said articles in sliding relation and located in the path of swing of said hammer, and stop means on the vehicle to limit downward motion of the articles when driven.

13. An implement for driving multipronged articles into the ground at evenly spaced intervals, comprising a wheeled vehicle, a hammer pivoted on the vehicle for swinging motion in a generally vertical path, a cam rotatably mounted on the vehicle and having a portion located to contact the hammer and a portion adapted to clear the hammer, whereby the hammer is intermittently free to drop, a connection between a wheel of the vehicle and the cam whereby the cam is actuated in synchronized relation with ground progress of the vehicle, holding means on the vehicle for articles to be driven, comprising elements with facing, vertically arranged grooves, adapted to receive the prongs of said articles in sliding relation and located in the path of swing of said hammer, stop means on the vehicle to limit downward motion of the articles when driven, and resilient means on the vehicle to arrest fall of the hammer short of contact thereof with said stop means.

14. A device as in claim 12, said stop means having an arcuate upper surface.

15. A device as in claim 12, said stop means having an arcuate and slanted upper surface.

16. A device as in claim 12, said hammer having a head with an arcuate under surface, and said stop means having an arcuate upper surface.

17. An implement for driving the prongs of U-shaped articles into the ground comprising a wheeled vehicle, a pair of guide elements for said articles having opposed, vertically arranged grooves to receive the prongs of said articles in sliding relation, with the plane of said articles generally transverse to said vehicle, a hammer having an arm pivoted, at a medial point thereof, to the vehicle for swinging motion, and having a head at one end adapted to swing between said guide elements, a cam mounted for rotation on said vehicle on an axis parallel to the axis of swing of said hammer, said cam having a portion adapted to contact the end of said hammer arm remote from said hammer head, and having a recess adapted to clear the end of said hammer arm, and means connecting a wheel of said vehicle with said cam to actuate said cam in timed relation with progress of the vehicle.

18. In a device as in claim 17, stop means having an arcuate upper surface to define a minimum height of said articles above ground, when driven.

19. A device as in claim 17, said hammer head having an arcuate under surface, and stop means in the path of motion of said articles in said guide elements, said stop means having an arcuate upper surface.

20. In a device as in claim 19, a resilient bumper positioned to arrest fall of said hammer short of contact of said hammer with said stop means.

DUANE H. LUKENS.

REFERENCES CITED

The following references are of record in the file of this patent:

UNITED STATES PATENTS

| Number | Name | Date |
| --- | --- | --- |
| 1,174,803 | Bathrick | Mar. 7, 1916 |
| 1,238,227 | Wehner | Aug. 28, 1917 |